United States Patent
Gentile et al.

[11] 3,833,885
[45] Sept. 3, 1974

[54] AUTOMATIC BANKING SYSTEM

[75] Inventors: Fred J. Gentile; Jack Chu-Wang Chang, both of Dallas, Tex.

[73] Assignee: Docutel Corporation, Dallas, Tex.

[22] Filed: May 24, 1973

[21] Appl. No.: 363,665

[52] U.S. Cl. .......................... 340/152 R, 340/149 A
[51] Int. Cl. ............................................ H04q 5/00
[58] Field of Search ..................... 340/152 R, 149 A

[56] References Cited
UNITED STATES PATENTS
3,308,238    3/1967    Brothman ..................... 340/149 X

*Primary Examiner*—Harold I. Pitts
*Attorney, Agent, or Firm*—Richards, Harris & Medlock

[57] ABSTRACT

A central processing unit coupled to one or more remote automatic dispensing terminal banking machines provides fully automatic stations for completing banking functions in response to a coded credit card presented to any one of the remote dispensing stations. After the credit card presented to one of the remote terminals has been initially checked to determine if the card has the proper format, coded information thereon is evaluated to check the users identity prior to authorizing them to complete a selected banking transaction. When each of several standard checks of the credit card code have been completed, a user is instructed to enter a transaction selection, comprising one of four banking functions, along with the amount of the banking transaction. At this point the remote terminal assembles an authorization request message and, upon receipt of a poll command from the central processing unit, transmits this inquiry message to a central computer. The central computer interrogates account files as appropriate and replies by transmitting an authorization reply message to the remote terminal. An authorization code included in this message by the central computer instructs the remote terminal how to complete the selected transaction. Following completion of the selected transaction, the remote terminal assembles a completion status message, and upon receipt of a poll command from the central processing unit, transmits this completion message to the central computer. Communications between the central processing unit and each of the remote terminals is thus completed only upon a poll command from the central computer.

24 Claims, 8 Drawing Figures

AUTOMATIC BANKING SYSTEM

BACKGROUND OF THE INVENTION

This invention relates to a banking system, and more particularly to a banking system for completing financial transactions by means of coded document actuated remote terminal banking machines.

Recent studies have shown that attempts are being made by the banking community to influence the general public to use fewer checks in their financial transactions and to thus reduce paper work at in bank services. This is primarily due to the difficulty of handling and processing the large amounts of paper required with check transactions. In its place, there appears to be a wide use of credit cards for completion of daily household and business transactions. A problem which has plagued the financial community with the increased use of credit cards is the unauthorized use of the cards due to loss by the owner or theft. This particular problem has been minimized by a scrambling coding technique as described in the patent to Kenneth S. Goldstein and John D. White, Credit Card Automatic Currency Dispenser, U.S. Pat. No. 3,662,343.

With the risk of unauthorized use now minimized, the banking industry has accepted automatic currency dispensers for unattended distribution of cash to complete some business and personal transactions. This, financial institutions have found, provides customer convenience and eliminates the need for the construction and operation of branch banks which are expensive and unprofitable.

Following the acceptance of automatic banking machines for cash withdrawal transactions, machine banking is now provided for deposit transactions, transfer transactions between accounts and payment transactions between accounts or from a deposited payment. All these additional functions are provided with the same security as strictly cash transactions of earlier systems by use of the scrambling coding technique described in the above-referenced patent of Kenneth S. Goldstein et al. Such machines for providing expanded automatic banking are fully disclosed in the copending U.S. Pat. application of Harold Don Fought, entitled Banking Machine, filed Apr. 12, 1972, Ser. No. 243,339 and assigned to the assignee of the present invention.

An automatic banking system in accordance with the present invention utilizes the automatic banking machine described in the above-referenced patent application of Harold Don Fought and provides convenience and speed of data processing. By use of unattended automatic banking remote terminals, a customer is not limited to normal banking hours or required to wait on the services of a bank employee to complete teller functions. By using coded credit cards in the remote terminals, a customer is not required to yield his identification with each use. Further, by several banks in a given area cooperating, a customer may complete certain banking functions at a cooperating bank by means of an interchange file stored at each of the remote terminals. To provide additional security, a plurality of the remote terminal banking machines are interconnected to a central computer wherein data is maintained on the validity and current status of each of the cards coded for a particular central computer.

SUMMARY OF THE INVENTION

In accordance with the present invention, a method of authorizing financial transactions in response to coded data on a document in an automatic banking system having a central processing unit and a plurality of remote dispensing terminals includes the steps of polling each of the remote dispensing terminals in sequence to ascertain the condition of each terminal to transmit an authorization request for the use thereof in response to document coded data. In response to a specific poll to a remote terminal, an authorization request is transmitted by the remote terminal to the central processing unit. Upon receipt of the authorization request, the central processing unit generates an authorization reply for transmission to the remote terminal. Prior to transmitting the authorization reply, the central processing unit polls each terminal in sequence to ascertain the condition thereof to accept a specific generated authorization reply. In response to a poll from the central processing unit, the authorization signal is transmitted to the remote terminals wherein a financial transaction is completed.

BRIEF DESCRIPTION OF THE DRAWINGS

A more complete understanding of the invention and its advantages will be apparent from the specification and claims and from the accompanying drawings illustrative of the invention.

Referring to the drawings.

DESCRIPTION OF THE PREFERRED EMBODIMENT

Figure 1:
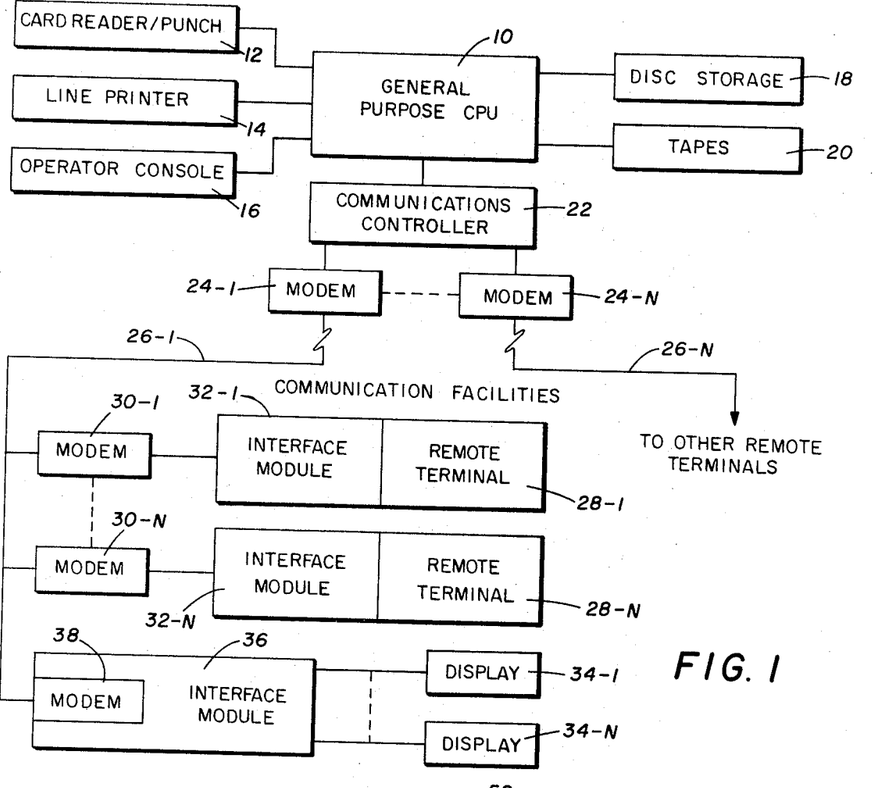
FIG. 1 is a block diagram of a typical embodiment of a stand alone general purpose computer interconnected to a plurality of remote terminals.

Referring to FIG. 1, information is exchanged between an on-line remote terminal banking machine and a general purpose computer 10 at two different time periods during each on-line transaction at the remote terminal. Coupled to the general purpose computer 10 is peripheral equipment including a card reader/punch 12, a line printer 14, an operator console 16, a disc storage 18 and a tape transport 20. Each of the peripheral equipment modules may comprise standard hardware available for coupling to a general purpose computer such as manufactured by IBM Corporation or the Burroughs Corporation.

Communication between the general purpose computer 10 and the remote terminal is completed through a controller 22 having a series of outputs individually coupled to communications modules 24-1 through 24-N. The communications modules are modulator/demodulator circuits for coupling signals from the general purpose computer 10 to standard communications lines 26-1 through 26-N. Each of the communications lines 26-1 through 26-N couples to a separate array of remote terminals such as the remote terminals 28-1 through 28-N.

In accordance with standard communication procedures, each of the remote terminals 28 is coupled to a communication line 26 through a communications module 30-1 through 30-N. Again, the communications modules comprise modulator/demodulator circuitry for converting the communication line signal to a signal acceptable to the remote terminal 28. As a further conditioning of signals from the modules 30-1 through 30-N, each of the remote terminals 28-1 through 28-N includes an interface module 32-1 through 32-N, respectively. The interface module conditions the output of the communications module 30 to be compatible with the signal characteristics of the remote terminal 28.

In addition to the remote banking terminals 28, the communications line 26-1 couples to additional credit processing equipment such as video displays 34-1 through 34-N. The video display systems are designed for local or remote operation to enable an operator to address the general purpose computer 10 and have a visual display of data requested. In accordance with standard techniques, each of the video displays 34 couples to the communications line 26 through an interface module 36 including a modulator/demodulator circuit 38. The displays 34 along with the interface 36 and the modulator/demodulator 38 form no part of this invention and comprise standard hardware available from computer manufacturers such as IBM and Burroughs.

Each of the other communications lines up to 26-N include an arrangement of remote terminals 28 and/or displays 34 as illustrated in FIG. 1. For purposes of understanding the present invention, however, only one communications line network is illustrated. It should be understood, that other arrangements of general purpose computers and remote terminals are possible to carry out the present invention wherein remote terminal banking machines are coupled on-line to a general purpose computer.

Figure 2:
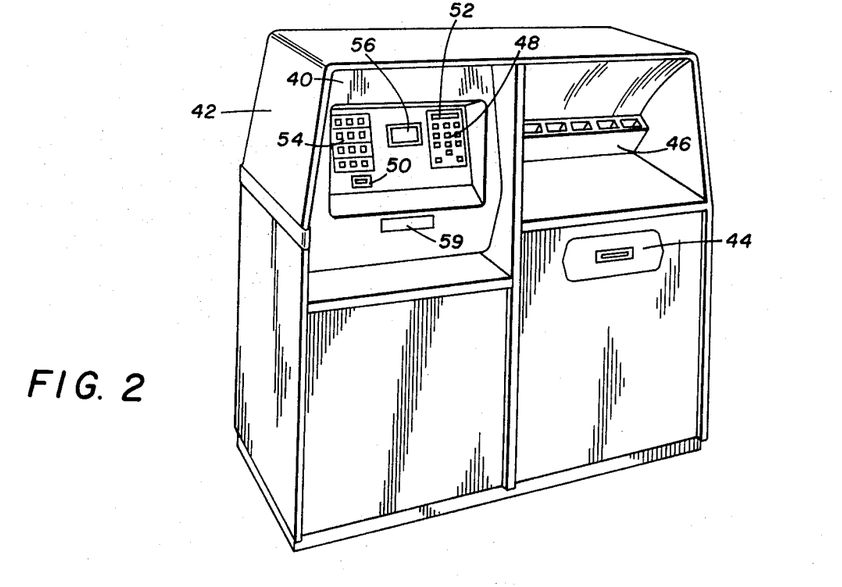
FIG. 2 is a pictorial view of a free standing model of a remote terminal automatic banking machine including a deposit module.

Referring to FIG. 2, there is shown a free standing remote terminal automatic banking machine 28 having the capability of operating on-line with the computer 10 or independent to carry out selected financial transactions. The machine includes a console 40 which houses all operating controls and indicators of a currency dispensing mechanism, a card handler, a receipt/voucher printer and necessary power supplies in addition to customer interface equipment. In the free standing unit, the console 40 is mounted within a cabinet 42 which also houses an electronic module containing a terminal computer and necessary interface equipment for communicating with the central computer 10 in addition to connections to the console 40. Also housed within the cabinet 42 is a depository module 44 containing an envelope transport, a serial numbering device, envelope stackers and necessary power supplies. A storage rack 46 is positioned within the cabinet 42 above the depository module 44 and provides an area for stationery supplies such as envelopes.

Figure 3:
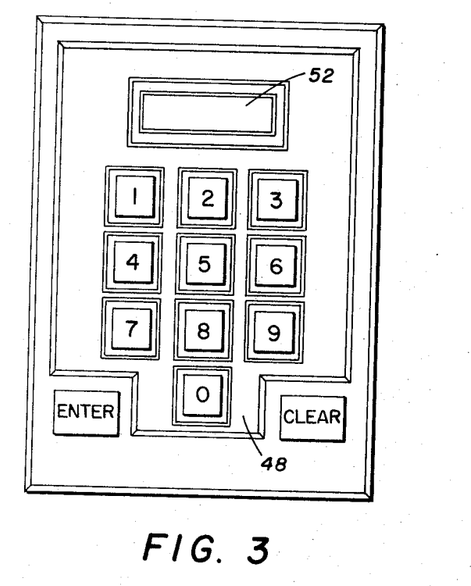
FIG. 3 is a front view of the security/amount keyboard customer interface for automatic banking processing.

On the front panel of the console 40, there is arranged an array of 12 push-button keys in an amount/security keyboard 48 for use by a customer to interface with the computer of the electronic module. As shown in FIG. 3, 10 of these keys, marked 0-9, are to enable a user to insert his assigned identification code for verification of his authority to use a credit card presented to the machine through a card gate 50. In addition, these ten keys, marked 0-9, enable a user to input into the system the value of the transaction to be completed. Transaction amounts, entered by operation of the push-button keyboard 48 are represented on a numeric display 52, thereby permitting verification of the selected amounts before continuation of the transaction. The numeric display 52 may be one of the type of electronic numeral displays commonly used as indicators of computer operation.

One of the remaining two keys of the group 48 is a "clear" push-button for correcting mistakes made by the user in inserting his assigned identification code or transaction amount. The remaining key is an "entry" push-button for commencing a communication operation with the central computer 10 or in an off-line operation commencing a processing transaction inputed into the machine.

Figure 4:
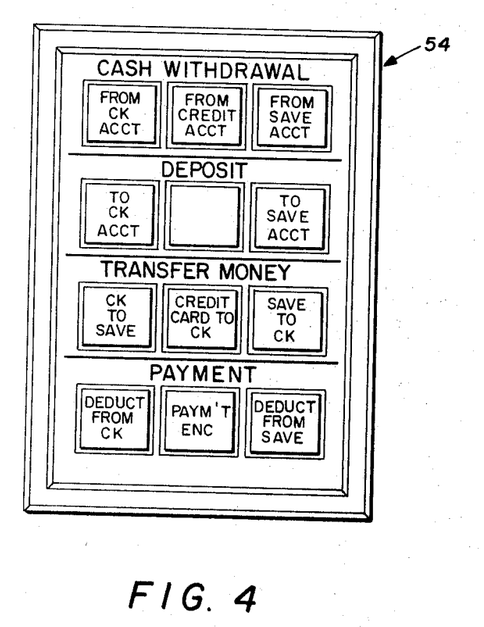
FIG. 4 is a front view of a transaction selection keyboard customer interface for banking functions processing.

Referring to FIG. 4, in addition to the push-button keys on the amount/security keyboard 48, the front panel of the console 40 includes a transaction keyboard 54 consisting of 12 push-buttons arranged in sets of three in four rows. The type of banking transaction performed by the remote terminal 28 depends upon the transaction key depressed in the keyboard 54. Each key in the four sets on the transaction keyboard 54 represents an independent banking transaction to be processed and completed by the system. The top set of three push-button keys represents cash withdrawal transactions. These transactions consist of a cash withdrawal from a checking account, a cash withdrawal from a credit card account, and a cash withdrawal from a savings account. In the second set of three push-button keys only two represent banking transaction; these are a deposit to a checking account and a deposit to a savings account. The third set of three push-button keys each represent a banking transaction wherein money is transferred between accounts. Included in the three transfer transactions are a transfer from a checking account to a savings account, a transfer from a credit card account to a checking account, and a transfer from a savings account to a checking account. In the last set of three push-button keys, the banking system processes a payment transaction. The payment transaction process consists of a payment deduction from a checking account, a payment by means of a user's deposited amount, and a payment from a savings account.

In addition to the above controls and indicators, the front panel of the console 40 includes an instruction window display 56 that provides for viewing an illuminated display message drum. As will be explained, the messages on this drum instruct a user in the operation of the remote terminal banking machine. The last user interface on the front panel of the console 40 is a cash drawer 59 that fits flush with the panel in a closed and locked position.

Figure 5:
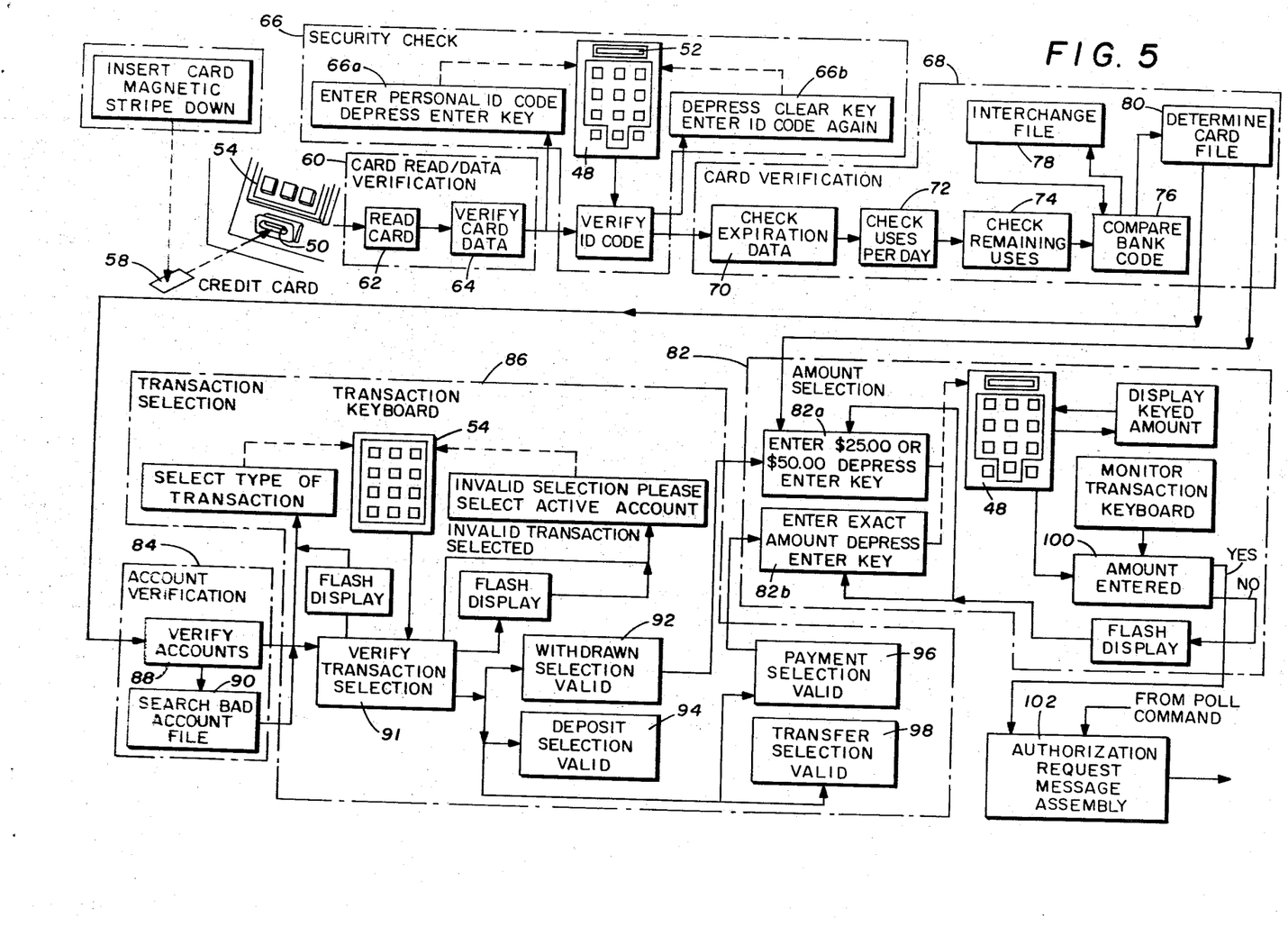
FIG. 5 is a block diagram of an automatic banking machine remote terminal in accordance with the present invention.

Referring to FIG. 5, upon presentation of a credit card 58 through the card gate 50 to the console 40, it is transported to a plurality of reading stations by a card reader to activate the various systems in a preordered sequence. Typically, a remote terminal banking machine in accordance with the present invention is activated by a standard "A" size plastic credit card having a stripe of magnetic material located on the backside.

As the credit card 58 moves through the system card reader, data read from the card initially activates a card read/data verification routine 60 wherein the data read from the card is verified as to its quantity and quality. This is a two step process comprising a read subroutine 62 and a data verifying subroutine 64. In the card read/data verification routine of the operating profile, data read from the card during subroutine 62 is verified by a sequence of computer instructions represented by the card data verifying subroutine 64.

Following data verification, the system proceeds to a security check routine 66 that compares two six digit numbers to assure that the user of the system is authorized to make use of the credit card inserted through the entry gate 50. The security check routine 66 of the operating profile makes use of the security/amount keyboard 48, and in particular, the 10 push-button keys numbered 0–9. During the security check routine 66, user instructions in blocks 66a and 66b appear at the instruction window display.

After a security check on the user of the machine, the system proceeds to a card verification routine 68 wherein limits on the use of the credit card 58 are checked. When in an on-line condition of the remote terminal the operating profile skips part of the card verification routine 68 and proceeds to the bank code subroutine 76. During an off-line transaction, the terminal computer of the electronic module performs the card verification routine 68 to determine if the credit card data is within established limits to assure invalid cards are not accepted. The first verification subroutine 70 determines the credit card expiration date and compares this data to the current calendar date. If the expiration date is less than or equal to the calendar date, card verification continues, if not, the transaction terminates. Every credit card is limited to a specific number of daily withdrawal transactions. The second verification subroutine 72 determines if the daily permitted use equals the actual use on the calendar date. Credit cards having a daily use limit greater than the actual uses as determined by data read from the card are approved for available transactions. Credit cards having a daily use equal to an actual use are approved for non-withdrawal transactions of the system. An individual credit card is also limited to a certain number of withdrawal transactions during a valid period. The third card verification subroutine 74 determines if additional withdrawal transactions are permitted. Cards having remaining use data equaling zero are approved for non-withdrawal transactions while cards having remaining use data greater than zero are approved for all transactions.

The bank code subroutine 76 completed both during an on-line operation and an off-line operation compares the card bank code to the bank code stored in computer memory. To complete the verification subroutine 76, a bank interchange memory 78 is interrogated. In this subroutine the credit card bank code is compared to bank codes listed on the interchange file in computer memory. Should the system fail to make a bank code comparison, the transaction terminates. The final verification subroutine 80 determines the type of credit card presented to the system. Credit cards approved for "withdrawal transactions only" proceed immediately to an amount selection routine 82. Credit cards approved for complete banking transactions advance the system operation to an account verification routine 84 in an off-line operation and to a transaction selection routine 86 in an on-line operation.

The credit card 58 contains identification data for from one to three accounts; namely, a credit card account, a savings account, and a checking account. In the account verification routine 84, two subroutines are completed; first, a determination of the type of account or accounts included on the credit card is made to enable corresponding transaction subroutine in the transaction selection routine 86. Secondly, in the account verification routine 84, a check is made of the credit card account information to assure each account number is valid. This is completed in an account verifying subroutine 88.

When off-line an additional function is also performed at this time. Credit account data and checking account data is compared to delinquent account data listed in a bad account section of terminal computer memory. This check is made during performance of a search bad account file subroutine 90. Should account verification detect an invalid or delinquent account number, the system proceeds to an error processing routine. If account verification is successfully completed the system proceeds to the transaction selection routine 86.

In the transaction selection routine 86, a user activates one of the transaction push-button keys in the transaction keyboard 54 corresponding to the desired type of banking transaction. After a selection is made, the system determines if the selection is enabled by the card and account verification routines. This transaction verification is completed in a subroutine 91. Upon completion of the subroutine 91, to the satisfaction that a proper transaction has been selected, the routine 86 continues to perform subroutines 92, 94, 96 or 98 depending upon the transaction selected. If either the withdrawal selection subroutine 92 or the payment selection subroutine 96 are completed, system operation advances to the amount selection routine 82. The user employs the security/amount keyboard 48 in conjunction with the numeric display 52 to select either the requested amount or enter the exact transaction amount. After properly inserting the amount, the user activates the "enter" key to activate a subroutine 100 to monitor the keyboard 48. During completion of the amount routine 82, the instructions of blocks 82a and 82b appear at the window display 56 for user operating guidance. For a more complete description of the operation of the banking machine of FIG. 2 in an off-line mode, reference is made to the copending application of Harold D. Fought, Ser. No. 243,339.

After selecting the transaction amount, a user pushes the "enter" push-button of the panel 48 and the system proceeds to an authorization request message assembly routine 102. In the routine 102 the terminal computer generates an authorization request message typically having the following items contained therein:

Terminal Address

Message Code

Transaction Key Depressed

Account Number

Amount

Routing and Transit Number

Expiration Date

Date of Last Use

Maximum Uses Per Day

Uses On Date of Last Use

Remaining Uses

This information is used by the central computer 10 to interrogate the appropriate account files. The routing and transit number identifies the bank which holds the account and may be used for file selection in situations where a bank interchange relationship has been established regarding a remote terminal banking machine. The account files maintained for authorizing financial transactions at a remote terminal may be positive (i.e., balance files), negative (i.e., bad account number files), or a combination of positive and negative.

At this time, the remote terminal of FIG. 2 awaits a specific poll from the general purpose computer 10 to transmit the authorization request message of the routine 102 to the general purpose computer 10.

Figure 6A:
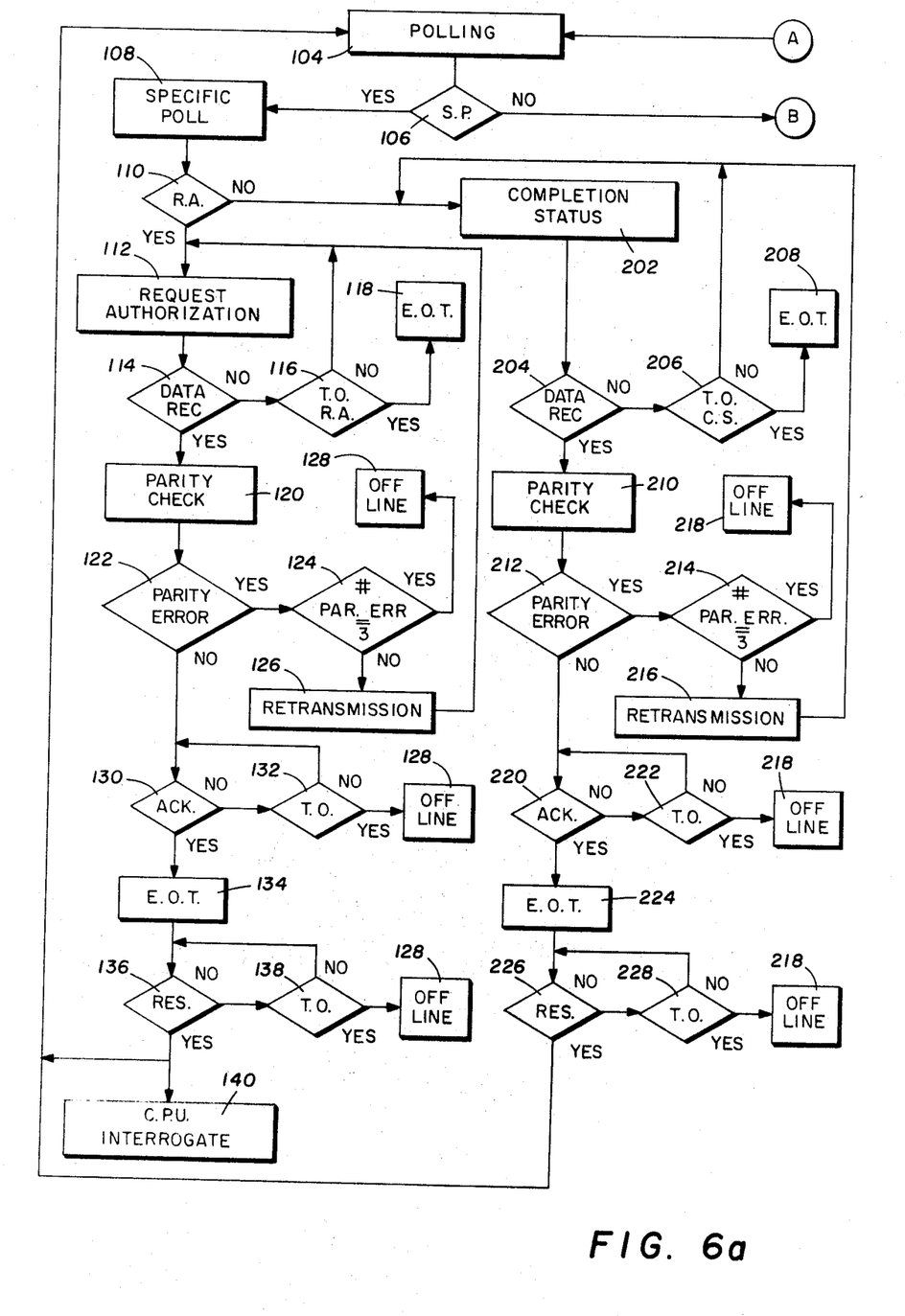
FIGS. 6a and 6b are a detail flow chart of the message and information exchange routine between a central computer and a remote terminal.
Figure 6B:
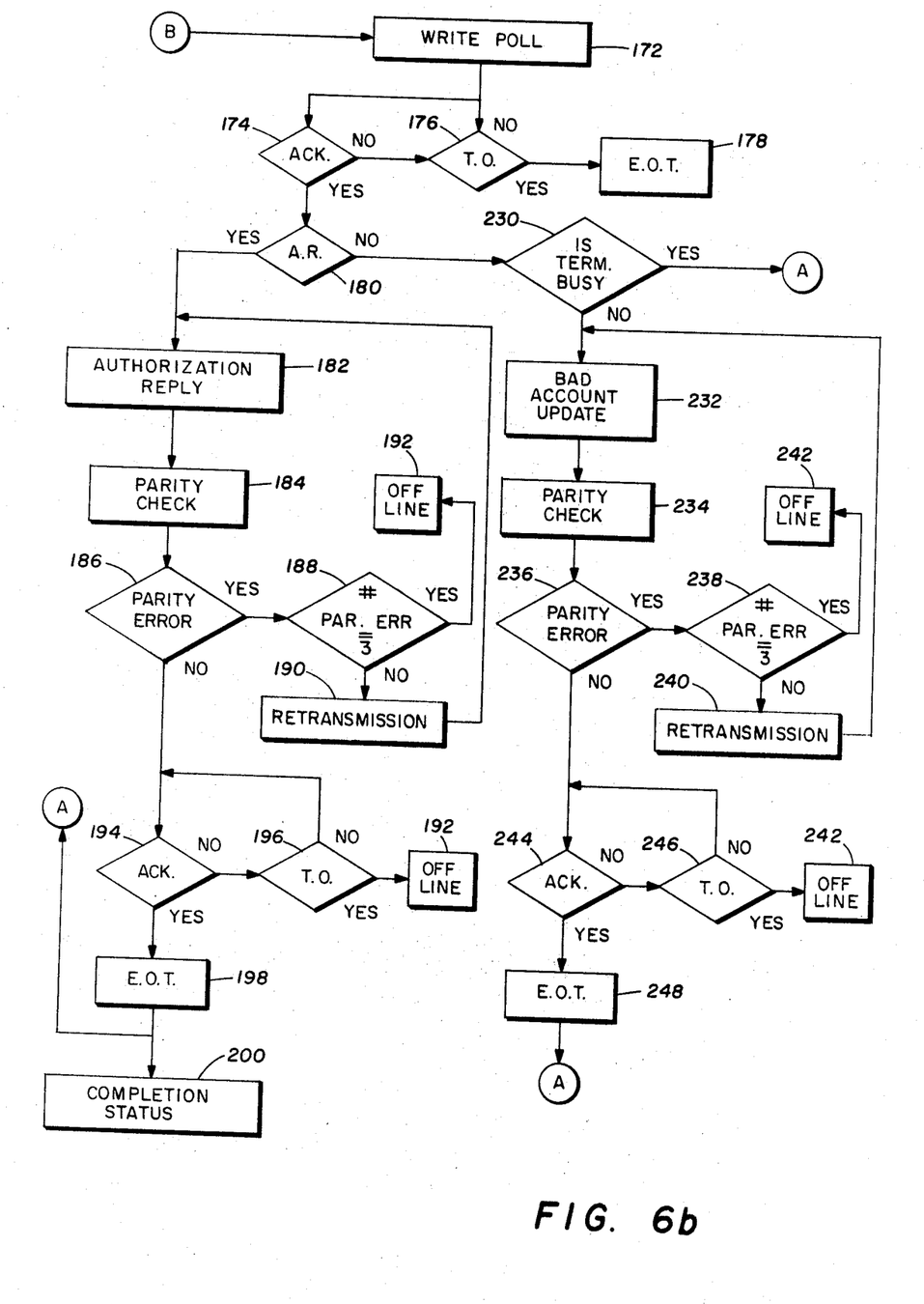

Referring to FIG. 6, there is shown a flow chart of the polling sequence of the general purpose computer 10 to poll each of the remote terminals 28-1 through 28-N. After initialization of the polling routine in a step 104 the computer 10 makes an inquiry 106 to determine if the poll contains the right address and if the poll is a specific poll or a write poll. The former is a poll of each of the remote terminals to determine the status thereof for transmitting an authorization request message or completion status data. The write poll is a procedure for transmitting an authorization reply from the central processing unit to a particular remote terminal in response to an authorization request message.

A positive response to the inquiry 106 advances the polling routine to a poll command step 108 wherein specific commands for each of the various remote terminals 28-1 through 28-N are generated. Following the specific poll command step 108, an inquiry 110 is made to determine if a specific poll is for the purpose of requesting an authorization message or the transmission of completion status data from a remote terminal. A positive response to the inquiry 110 advances the polling routine to a step 112 wherein a specific remote terminal is addressed at the step 102 to ascertain if that remote terminal is in condition to transmit an authorization request message as generated by the message routine.

In the situation where a particular remote terminal has an authorization request message assembled, it is now transmitted over the communication line 26 through the controller 22 to the general purpose computer 10. An inquiry 114 is made to determine if the data of the authorization request message has been received by the general purpose computer 10. A negative response, indicating that the message has not been completely transmitted, advances the sequence to an inquiry 116 which is a time-out set to limit the amount of time a remote terminal is allotted to transmit a message to the general purpose computer 10. If the time-out as set by the inquiry 116 has not expired, a negative response returns the sequence to the step 112. A positive response to the inquiry 116, indicating that the allowed time for receiving an authorization request message by the general purpose computer has elapsed, advances the routine to an end of transmission (E.O.T.) step 118. Advancing the sequence to step 118 causes the poll command of the next remote terminal to be generated.

A positive response to the "data received" inquiry 114 advances the polling routine to a step 120 wherein parity checks on the data transmitted to the general purpose computer 10 are made. Both vertical and longitudinal parity checks are made and the even/odd technique is employed for parity error determination. That is, if the data transmitted from the remote terminal to the general purpose computer 10 contains the correct disposition in both the longitudinal and vertical axis the result will be an even number of bits in each direction.

Following the parity check step 120, an inquiry 122 is made to determine if both the longitudinal and vertical checks produce an even result. A positive response to the inquiry 120 indicating an error has been detected advances the routine to an inquiry 124 to determine how many times the routine has advanced to the inquiry 122. If less than three times, the inquiry 124 produces a negative response advancing the routine to a retransmission step 126 which returns the routine to the step 112 to again request the authorization request message from the specific remote terminal. A positive response to the inquiry 124, indicating that three attempts have been made to transmit the authorization request message from a remote terminal to the general purpose computer 10, advances the routine to a step 128 which causes a particular remote terminal to go off-line.

When a terminal goes off-line for any reason the operation thereof reverts to that as described in the referenced copending application of Harold Don Fought, Ser. No. 243,339.

If both the longitudinal and vertical parity checks are even, the inquiry 122 produces a negative response and the routine advances to an acknowledge inquiry 130. Acknowledge inquiry 130 is made by a remote terminal to determine if it has positively received an acknowledge signal from the general purpose computer 10 in response to the transmission thereto of an authorization request message. A negative response to the inquiry 130, indicating that the general purpose computer has not acknowledged the receipt of an authorization request message, advances the sequence to a time-out inquiry 132. In the time-out inquiry 132, the general purpose computer 10 is given a preselected time to transmit the acknowledge or reset signal. Before this preselected time expires, the inquiry 132 produces a negative result and the routine returns to the acknowledge inquiry 130. If a time-out has expired during the inquiry 132 a positive result advances the sequence to an off-line step 128.

A positive response to the acknowledge step 130 advances the sequence to an end-of-transmission step 134 ending the transmission of data between a specific remote terminal and the general purpose computer 10.

Following the end-of-transmission step 134, the polling routine advances to an inquiry 136 to determine if the remote terminal has been reset to a ready condition. Again this is a time-out sequence and a negative response to the inquiry 136 advances the routine to a time-out inquiry 138, wherein, before the preselected time has expired, a negative result returns the sequence to the inquiry 136. A positive response to the time-out inquiry 138, indicating the system has not reset, the central processing unit advances the sequence to indicate a terminal error condition and resumes polling of the next terminal in sequence.

A positive response to the inquiry 136, indicating that the system has reset returns the polling routine to the initialization step 104 and also initiates a central processing unit interrogate routine 140.

Figure 7:
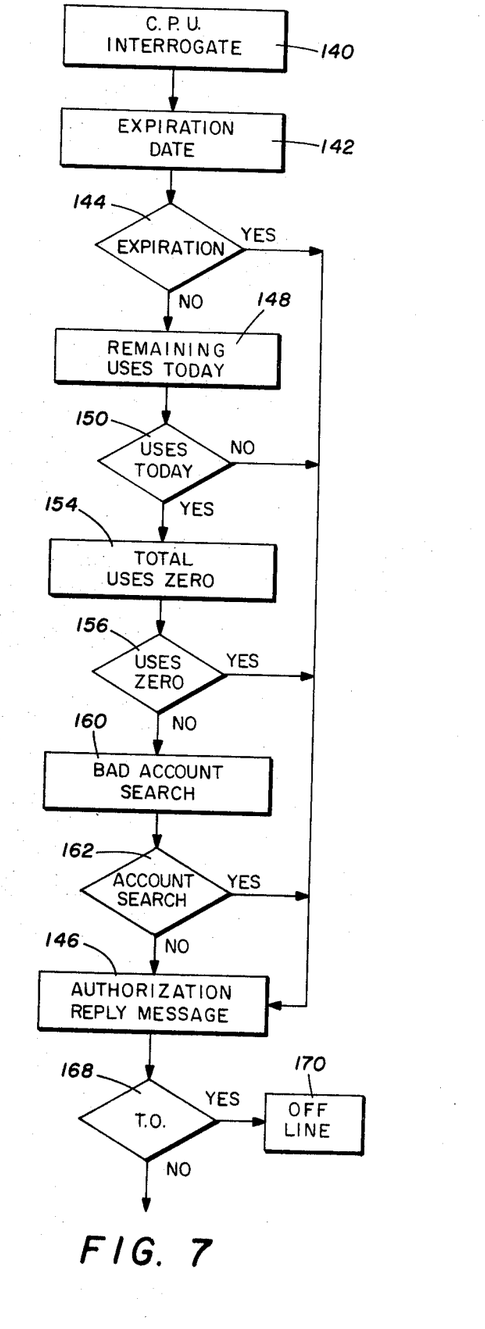
FIG. 7 is a flow chart of the interrogation routine in the central processing unit.

Referring to FIG. 7, a positive response to the inquiry 136 advances the central computer 10 to initialization step 140 of a central processing unit interrogate routine. The first step in the interrogation routine is to check an expiration date file in a step 142. This check compares the calendar date with the expiration date of the account number transmitted with the authorization request message from a particular remote terminal. Following the step 142, an inquiry 144 is made to determine if the expiration date has passed. A positive response to the inquiry 144, indicating that the particular account has expired, advances the interrogation routine to a step 146 to generate a "no" authorization reply code signifying that the card has expired. A negative response to the inquiry 144 advances the interrogate routine to a step 148 wherein the number of uses remaining for a particular day for a certain account is checked. This check is made by a comparison of data transmitted to the central computer 10 with the authorization request message. An inquiry 150 is made to determine if any uses for a particular day remain for the account in question. A negative response to the inquiry 150, indicating that no uses remain, advances the routine to the step 146, wherein a "no" authorization reply code is generated indicating that the total daily uses has been exceeded.

A positive response to the inquiry 150 indicates the card presented to the remote terminal has remaining daily uses available and the routine advances to a total number of uses step 154. In the step 154, the sequence evaluates data transmitted with the authorization request message to determine if the total allowed number of uses of a particular card has been reached. Following the step 154, inquiry 156 is made and if the result of step 154 is that the total uses remaining equal zero then a positive response results from the inquiry 156 and the routine advances to the step 146 wherein a code is generated denying authorization to complete a transaction. The code indicates that the total uses for a particular card has been reached.

A negative response to the inquiry 156 advances the central processing unit interrogate routine to a bad account search step 160 wherein a bad account file stored in the central computer 10 is compared with the account number transmitted from a remote terminal in the authorization request message. Inquiry 162 is made to determine if in the step 160 a comparison was found between the request message account and the bad account file. A positive response to the inquiry 162 indicates that the account number in issue has been found in the bad account file and the sequence advances to the step 146 wherein a code is generated denying authorization to complete a financial transaction. A negative response to the inquiry 162 indicates that the interrogate routine has been completed favorably and an authorization reply message is generated at the step 146.

Following the authorization reply message step 146, an inquiry 168 is made to determine if a time-out has been reached. The interrogate routine must be completed within a preselected time and if not a positive response results from inquiry 168 advancing the routine to an off-line step 170. The remote terminal then operates off-line as explained previously. A positive response to the inquiry 168 indicates that the time-out has not expired and the central processing unit is ready to tranmit an authorization reply message to a specific remote terminal.

Returning to FIG. 6, following the initialization step 104 of the polling routine the inquiry 106 is made and a negative response thereto indicates a write poll sequence for the central processing unit. The polling routine then advances to a write poll command step 172 wherein a write poll command is generated for the intended remote terminals 28. After one or more write polls have been transmitted to a particular remote terminal, an acknowledge inquiry 174 is made to determine if the remote terminal has in fact received the command poll. A negative response to the inquiry 174, indicating that the remote terminal has not acknowledged the poll command, advances the routine to an inquiry 176 which is a time-out set for a preselected time. Before the time-out has expired, the inquiry 176 produces a negative response and the routine returns to the acknowledge inquiry 174. If the acknowledge inquiry 174 produces a negative response and the time-out has expired, the inquiry 176 results in a positive response and the routine advances to an end-of-transmission step 178.

A positive response to the acknowledge inquiry 174, indicating that the remote terminal has received a write poll, advances the sequence to an authorization reply inquiry 180. Inquiry 180 then evaluates the poll command to determine if the poll has been generated to transmit an authorization reply or transmit bad account data. A positive response to the inquiry 180 advances the sequence to the authorization reply step 182 wherein the authorization reply message data as generated in the subroutine of FIG. 7 is transmitted from the general purpose computer 10 to the specific remote terminal to which the write poll is directed.

The authorization reply message contains terminal address data, the message code, an authorization code, and other data as required. In the authorization reply message, the authorization codes provide instruction to the remote terminal on how to complete the selected transaction. Following is a list of a typical set of authorization codes.

0 = card expired

1 = total uses exceeded

2 = daily uses exceeded

3 = ineligible account, return card

4 = insufficient funds

5 = unauthorized - capture card

6 = transaction authorized

7 = withdrawal authorized for partial completion

Following transmission of the authorization reply message in the step 182 from the general purpose computer 10 to a particular remote terminal, a parity check step 184 is completed to determine the correctness of the message received by the remote terminal. The parity check step 184 is similar to the step 120 in that the even/odd technique for evaluating the data transmitted is made. Following the parity check step 184 an inquiry 186 is made to determine if any parity errors have been detected. A positive response, indicating that a parity error exists, advances the routine to an inquiry 188 wherein the number of times an error has occurred is evaluated. If the number of errors is three or less, the inquiry 188 advances the routine to a retransmission step 190 which returns the routine to the authorization reply step 182. If two retransmissions of the authorization reply message have taken place, then the inquiry 188 results in a positive response and the routine advances to an off-line step 192. The remote terminal then reverts to off-line operation, as explained.

A negative response to the parity error inquiry 186 is generated when no errors exist in the parity check step 184. This advances the routine to an acknowledge step 194 wherein an acknowledge code is generated and transmitted from the remote terminal to the central processing unit. The acknowledge code is generated when the remote terminal receives a complete authorization reply message. A negative response to the inquiry 194, indicating the terminal has not generated the acknowledge code, advances the routine to the inquiry 196 which is a time-out for limiting the amount of time alotted for first transmission of an authorization reply message to a remote terminal and second transmission of an acknowledge code from the remote terminal to the general purpose computer 10. Before the time-out has expired the inquiry 196 produces a negative response and the routine returns to the inquiry 194. If the reply message and an acknowledge code have not been transmitted from the remote terminal before the time selected has expired, the routine advances to the off-line step 192.

A positive response to the acknowledge inquiry 194 advances the polling routine to an end-of-transmission step 198 signifying the end of a write poll transmission subroutine. Following the end-of-transmission step 198, the polling routine returns to the initialization step 104 and the write poll subroutine advances to a completion status subroutine 200.

During the completion status subroutine 200, the remote terminal assembles a completion status message that is transmitted to the central processing unit upon receipt of a specific poll command. The completion status message contains the remote terminal address, a message code, the transaction amount, transaction serial number, account number, routing and transit number, communications status code, and an error code.

Following assembly of the completion status message, the transaction in the remote terminal continues with cash dispensing, deposit acceptance, and receipt printing as appropriate for the particular transaction type selected by the user at the transaction keyboard 54. Once these activities are completed, the credit card 58 is returned to the user and the cash envelope and/or receipt are dispensed to the customer by opening the cash drawer 59. After the cash drawer closes, the remote terminal is ready for a new transaction to begin.

To transact the completion status message from the remote terminal to the general purpose computer 10, the polling routine advances through the initialization step 104, the inquiry 106, to the specific poll step 108 and from the inquiry 110 along the negative response path to a completion status step 202. In the step 202, the completion status message, as generated by the subroutine 200, is transmitted from the remote terminal to the general purpose computer 10 in response to the poll command.

Following the transmission step 202, an inquiry 204 is made to determine if the data has been received by the computer 10. A negative response advances the routine to a time-out inquiry 206 having a preselected time limit. Prior to expiration of the time limit, the routine returns from the inquiry 206 to the completion status step 202. After the time-out, if the data of the completion status message has not been received by the computer 10, the routine advances to the end-of-transmission step 208.

A positive response to the data received inquiry 204 advances the routine to a parity check step 210 similar to the parity check step 120. Following the parity check step 210 a parity error inquiry 212 is made and if an error results, the routine advances to an inquiry 214. Inquiry 214 evaluates the number of attempted transmissions of the completion status message, and when less than three, the routine advances to a retransmission step 216 to return the routine to the completion status step 202. When a parity error still exists after the second retransmission of the completion status message, the inquiry 214 advances the routine to an off-line step 218 to return the remote terminal to an off-line operation.

A negative response to the parity error inquiry 212 indicates no errors exist in the transmission of the completion status message and the routine advances to an acknowledge inquiry 220. In the inquiry 220, the remote terminal is to receive an acknowledge code from the central processing unit acknowledging receipt of the completion status message. A negative response to the inquiry 220 advances the routine to the time-out inquiry 222 having a preselected time limit. Prior to the expiration of the preselected time limit, the routine returns to the acknowledge inquiry 220. After the time-out has expired, if an acknowledge code has not been received by the remote terminal, the routine advances to an off-line step 218.

A positive response to the acknowledge inquiry 220 advances the routine to an end-of-transmission step 224 signifying the end of the transmission of a completion status message from the remote terminal to the central processing unit. The routine then advances to a reset inquiry 226. If the system has not been reset, the inquiry produces a negative response and the routine advances to a time-out inquiry 228. Before expiration of the preselected time limit of the inquiry 228, the routine returns to the inquiry 226. Upon expiration of the time-out inquiry 228, the routine advances to the off-line step 218. A positive response to the reset inquiry 226 returns the polling routine to the initialization step 104 and the system is ready to resume polling of the remote terminals 28.

Periodically, throughout the operation of the system of FIG. 1, an operator by means of the peripheral equipment attendant to the general purpose computer 10, updates the bad account information stored therein. This updated bad account data on file in the general purpose computer 10 is utilized to generate a bad account message for transmission to a remote terminal 28. Bad account messages will be processed by a remote terminal any time the particular terminal is not busy. The bad account message transmission is made in response to a poll command during one subroutine of the polling routine.

Following the initialization step 104, the inquiry 106 and the write poll step 172 by means of the negative channel from the inquiry 106, the bad account subroutine advances through the acknowledge step 174 and the authorization reply inquiry 180 to an inquiry 230, after a negative response from the inquiry 180. The inquiry 230 evaluates the status of a particular remote terminal and if busy generates a positive response for returning the polling routine to the initialization step 104.

If a particular polled terminal is not busy, the inquiry 230 generates a negative response and the bad account routine advances to a step 232 wherein the bad account message is transmitted from the central processing unit to a particular remote terminal 28. A bad account message contains a particular terminal address, a message code, bad account load printer pointer and an account number.

Following the step 232 a parity error step 234 is completed. This step is similar to the parity check step 120. Following the step 234 the parity error inquiry 236 is made to determine if any errors have been detected in the step 234. Any errors so detected advances the routine to the inquiry 238 wherein the number of transmissions of the bad account message is evaluated. If less than three transmissions have been attempted, the routine advances to a retransmission step 240 and then back to the bad account update step 232. If two retransmissions have been attempted of the bad account message the inquiry 238 produces a positive result and the sequence advances to an off-line step 242 and the remote terminal reverts to off-line operation.

When no parity errors are detected in the step 234, the inquiry 236 produces a negative response and the routine completes an acknowledge inquiry 244, the general purpose computer 10 must receive an acknowledge code from the particular remote terminal acknowledging receipt of the bad account message. Prior to receiving this acknowledge code, the inquiry 244 advances the routine to a time-out inquiry 246 having a preselected time limit. Before expiration of this time limit, the sequence is returned to the acknowledge inquiry 244 from the inquiry 246. If the inquiry 244 generates a negative response and the time-out has expired, the inquiry 246 advances the routine to the off-line step 242. A positive response to the acknowledge inquiry 244 advances the routine to an end-of-transmission step 248 signifying the end of the transmission of the bad account message from the general purpose computer 10 to the remote terminal. The sequence then returns to the initialization step 104.

The bad account message enables a remote terminal to recognize the bad account information transmitted by the central computer 10. When received by the remote terminal, the bad account information is stored in the terminal computer for off-line operation of the terminal. This offers a method of maintaining a current bad account file in a particular remote terminal for use in case of off-line fallback during central computer and/or communication facilities outage.

While only one embodiment of the invention, together with modifications thereof, has been described in detail herein and shown in the accompanying drawings, it will be evident that various further modifications are possible without departing from the scope of the invention.

What is claimed is:

1. The method of authorizing financial transactions in response to coded data on a document in an automatic banking system including a central processing unit and a plurality of remote terminals, comprising the steps of:
    polling each of the remote terminals in sequence to ascertain the condition thereof to transmit an authorization request for the use in response to document coded data,
    transmitting an authorization request for a polled remote terminal to the central processing unit,
    generating an authorization code to the remote terminal transmitting an authorization request,
    polling each terminal in sequence to ascertain the condition thereof to accept a specific generated authorization code,
    transmitting the authorization code to the remote terminal, and
    completing a financial transaction in the remote terminal in response to the authorization code.

2. The method of authorizing financial transactions as set forth in claim 1 including the step of interrogating the central processing unit to evaluate an authorization request for a financial transaction.

3. The method of authorizing financial transactions as set forth in claim 2 wherein the step of interrogating the central processing unit includes:
    comparing an expiration date code read from the document with a document expiration date code stored in the central processing unit for verification of the document validity.

4. The method of authorizing financial transactions as set forth in claim 3 wherein the step of interrogating the central processing unit further includes:
    comparing a code of uses per day read from the document with the number of uses per day allowed stored in the central processing unit for verification of the document validity and transaction authorization.

5. The method of authorizing financial transactions as set forth in claim 4 wherein the step of interrogating the central processing unit further includes:
    comparing a total number of uses for the presented document as read therefrom with a total allowed uses code stored in the central processing unit for transaction authorization.

6. The method of authorizing financial transactions as set forth in claim 5 wherein the step of interrogating the central processing unit further includes:
    comparing an account number code read from the document with a list of account number codes stored in the central processing unit for verification of a particular account number.

7. The method of authorizing financial transactions as set forth in claim 1 including the step of generating an authorization request at a specific remote terminal in response to a document presented thereto.

8. The method of authorizing financial transactions as set forth in claim 7 wherein the step of generating the authorization request includes:
reading coded data from the presented document, and
comparing the coded data with a verification code inserted and stored in the remote terminal for verification of the validity of the presented document.

9. The method of authorizing financial transactions as set forth in claim 8 wherein the step of comparing the read code data with a verification code includes the step of comparing a read bank code with a stored bank code for verification of the document validity.

10. The method of authorizing financial transactions as set forth in claim 9 wherein the step of generating the authorization request further includes:
generating a financial transaction selection code representing a banking function from a selection consisting of: a withdrawal transaction, a deposit transaction, a transfer transaction and a payment transaction.

11. The method of authorizing financial transactions in response to coded data on a document in an automatic banking system including a central processing unit and a plurality of remote terminals, comprising the steps of:
polling each remote terminal in sequence to ascertain the condition thereof to accept a generated authorization code from the central processing unit,
transmitting the authorization code to the individual remote terminal,
completing a financial transaction in the remote terminal in response to an authorization code, and
polling each of the remote terminals in sequence to ascertain the condition thereof to transmit completion status data reflecting completion of a financial transaction in a remote terminal.

12. The method of authorizing financial transactions as set forth in claim 11 including the step of generating completion status data in a remote terminal for transmission to the central processing unit in response to a specific poll therefrom.

13. The method of authorizing financial transactions as set forth in claim 12 including the step of polling each of the remote terminals in sequence to ascertain the condition thereof to transmit an authorization request for use in response to the document coded data.

14. The method of authorizing financial transactions as set forth in claim 13 including the step of transmitting an authorization request for a polled terminal to the central processing unit.

15. The method of authorizing financial transactions as set forth in claim 14 including the step of generating an authorization code to the remote terminal transmitting an authorization request.

16. The method of authorizing financial transactions in response to coded data on a document in an automatic banking system including a central processing unit and a plurality of remote terminals, comprising the steps of:
generating bad account update data in the central processing unit for each of the intended remote terminals,
polling each intended remote terminal in sequence to ascertain the condition thereof to accept bad account update data, and
transmitting the updated bad account data to a remote terminal.

17. The method of authorizing financial transactions as set forth in claim 16 including the steps of:
generating an authorization code to a remote terminal transmitting an authorization request,
transmitting the authorization code to the individual remote terminals, and
completing a financial transaction in the remote terminal in response to the authorization signal.

18. The method of authorizing financial transactions as set forth in claim 17 including the step of polling each terminal in sequence to ascertain the condition thereof to accept a specific authorization code.

19. The method of authorizing financial transactions as set forth in claim 18 including the step of polling each of the remote terminals in sequence to ascertain the condition thereof to transmit an authorization request for the use in response to document coded data.

20. The method of authorizing financial transactions as set forth in claim 19 including the step of transmitting an authorization request for a polled remote terminal to the central processing unit.

21. Apparatus for authorizing financial transactions in response to coded data on a document in an automatic banking system including a central processing unit and a plurality of remote terminals, comprising in combination:
first means as part of the processing unit polling each of the remote terminals in sequence to ascertain the condition thereof to transmit an authorization request for use in response to document coded data,
means for transmitting an authorization request for a polled remote terminal to the central processing unit,
second means as part of the processing unit for generating an authorization code for the remote terminal transmitting an authorization request,
third means as part of the processing unit for polling each terminal in sequence to ascertain the condition thereof to accept a specific generated authorization code,
means for transmitting the authorization code to the individual remote terminals,
means as part of each remote terminal for completing a financial transaction in the remote terminal in response to the authorization code,
fourth means as part of the processing unit for polling each of the remote terminals in sequence to ascertain the condition thereof to transmit transaction completion status data,
means as part of each remote terminal for generating transaction completion status data at the completion of a financial transaction at the remote terminal,
fifth means as part of the processing unit for polling each intended remote terminal in sequence to ascertain the condition thereof to accept bad account update data, and
means for transmitting updated bad account data from the central processing unit to a remote terminal.

22. Apparatus for authorizing financial transactions as set forth in claim 21 including sixth means as part of the processing unit for generating bad account update data.

23. Apparatus for authorizing financial transactions as set forth in claim 21 including means at each remote terminal for generating an authorization request at a specific remote terminal.

24. Apparatus for authorizing financial transactions as set forth in claim 21 including seventh means as part of the processing unit for interrogating the unit to evaluate an authorization request for a financial transaction.

* * * * *

Disclaimer 3,833,885.—*Fred J. Gentle*, and *Jack Chu-Wang Chang*, Dallas, Tex. AUTOMATIC BANKING SYSTEM. Patent dated Sept. 3, 1974. Disclaimer filed Jan. 5, 1983, by the assignee, *Docutel Corp.*

Hereby enters this disclaimer to claims 16–20 of said patent.

[*Official Gazette March 15, 1983.*]